(12) United States Patent
Mann et al.

(10) Patent No.: US 6,790,416 B2
(45) Date of Patent: Sep. 14, 2004

(54) HYDROGEN GENERATION SYSTEM

(75) Inventors: L. Chris Mann, Corvallis, OR (US); Timothy J Corbett, Corvallis, OR (US); Qin Liu, Corvallis, OR (US); Ravi Prasad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 161 days.

(21) Appl. No.: 10/157,279

(22) Filed: May 28, 2002

(65) Prior Publication Data

US 2003/0224229 A1 Dec. 4, 2003

(51) Int. Cl.[7] .............................. C01B 3/02; C01B 3/04; C01B 3/08; B01J 8/02
(52) U.S. Cl. ...................... 422/211; 422/236; 48/118.5; 423/657; 423/658.2
(58) Field of Search .............................. 423/657, 658.2; 48/118.5; 422/211, 236

(56) References Cited

U.S. PATENT DOCUMENTS

| 4,155,712 | A |   | 5/1979  | Taschek |
| 4,261,955 | A |   | 4/1981  | Bailey, Jr. et al. |
| 5,514,353 | A |   | 5/1996  | Adlhart |
| 5,976,725 | A |   | 11/1999 | Gamo et al. |
| 6,592,741 | B2 | * | 7/2003 | Nakanishi et al. .......... 205/343 |
| 2001/0045364 | A1 |   | 11/2001 | Hockaday et al. |
| 2003/0118504 | A1 | * | 6/2003 | Mazza et al. ............... 423/645 |

FOREIGN PATENT DOCUMENTS

| DE | 10045669 | 4/2001 |
| EP | 1170249  | 1/2002 |

* cited by examiner

Primary Examiner—Gregg Cantelmo

(57) ABSTRACT

Hydrogen generation system. A source of sodium borohydride is carried on a flexible substrate that moves from a feed roll to a takeup roll. A reaction among sodium borohydride, a catalyst and water evolves hydrogen and forms a by-product that is removed from the reaction area.

13 Claims, 3 Drawing Sheets

HYDROGEN GENERATION SYSTEM

BACKGROUND OF THE INVENTION

This invention relates to hydrogen generation, and more particularly, to a system for the catalytic hydrolysis of sodium borohydride.

As is well known, fuel cells combine hydrogen and oxygen to generate electricity. In some applications, it is necessary to precisely and accurately meter hydrogen, on demand, to a fuel cell to control the electrical output. An example is a miniaturized PEM fuel cell.

It is also known that hydrogen can be evolved from reactive solutions such as by the catalytic hydrolysis of sodium borohydride, $NaBH_4$. A prior art approach for generating hydrogen on demand for use in fuel cells utilized pumps to deliver an aqueous solution of sodium borohydride to a catalyst bed. There are, however, problems with this approach. A stoichiometric sodium borohydride aqueous solution has high viscosity that makes it difficult to pump in a precise manner. Sometimes nonreactive chemicals were added to lower the viscosity or a nonstoichiometric ratio was used to aid pumping. Alternatively, a strong base, such as sodium hydroxide, was added to the sodium borohydride solution in an effort to stabilize it. The resulting solution was then caustic making handling more difficult.

Another problem with the prior art approach is that the hydrolysis reaction generates a by-product, sodium metaborate, $NaBO_4$, that must be removed. Sodium metaborate tends to pick up water and to gel when allowed to cool. Its presence hinders access to the catalyst and makes the water needed for the reaction less available. If this reaction product is allowed to cool and gel, it cannot be readily pumped away.

Another approach to evolving hydrogen from sodium borohydride is to heat the material to generate hydrogen as needed. A problem with this approach is high parasitic loss and another problem may be material compatibility issues.

SUMMARY OF THE INVENTION

The hydrogen generation system of the invention includes a source of sodium borohydride along with a source of water and a catalyst such as ruthenium. Structure is provided for contacting sodium borohydride, water and catalyst to release hydrogen and to move the reactants into and away from a reaction zone.

A BRIEF DESCRIPTION OF THE DRAWING

DESCRIPTION OF THE PREFERRED EMBODIMENT

In one embodiment, a solution of sodium borohydride and water is encapsulated and supported on a flexible substrate. In this embodiment, the solution is encapsulated in rupturable microspheres, and the flexible substrate includes the catalyst thereon. This embodiment further includes means to rupture the microspheres to allow the solution to contact the catalyst. In this embodiment, the rupturing means includes rollers forming a nip therebetween.

In another aspect, the aqueous sodium borohydride solution is encapsulated in a penetratable compartment carried on a flexible substrate and the system further includes a catalyst-containing structure for penetrating the compartment to allow the catalyst to contact the solution. In this embodiment, the catalyst-containing structure forms spike-like elements extending from a roller. In these preferred embodiments, the flexible substrate moves from a supply roll to a take-up roll, and in this way the sodium metaborate by-product is removed from the reaction zone.

In another embodiment, the sodium borohydride is supported in solid form on a flexible substrate for contact with a catalyst-coated element, and the system further includes structure for supplying water to contact the sodium borohydride and catalyst. In this embodiment, it is preferred that the catalyst-coated element be hollow and perforated and that water is supplied to the interior of the element. A suitable catalyst for all of these above-described embodiments is ruthenium.

The hydrogen generation system of the present invention accurately meters hydrogen on demand and the sodium metaborate reaction product is removed from the reaction zone so as not to interfere with the hydrolysis reaction.

Figure 1:
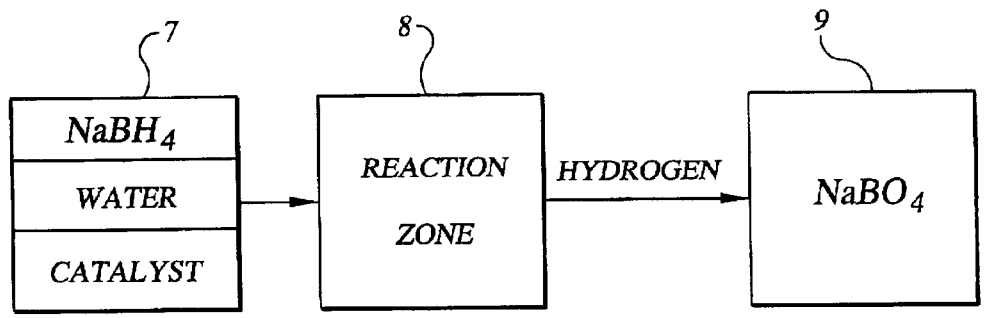
FIG. 1 is a block diagram of an exemplary embodiment of the system of the invention.

With reference first to FIG. 1, block 7 represents a source of sodium borohydride, water, and a catalyst. These materials are contacted to one another in a reaction zone 8 to generate hydrogen and a reaction product, sodium metaborate 9, is removed from the reaction zone 8 so that the reaction is not impeded.

Figure 2:
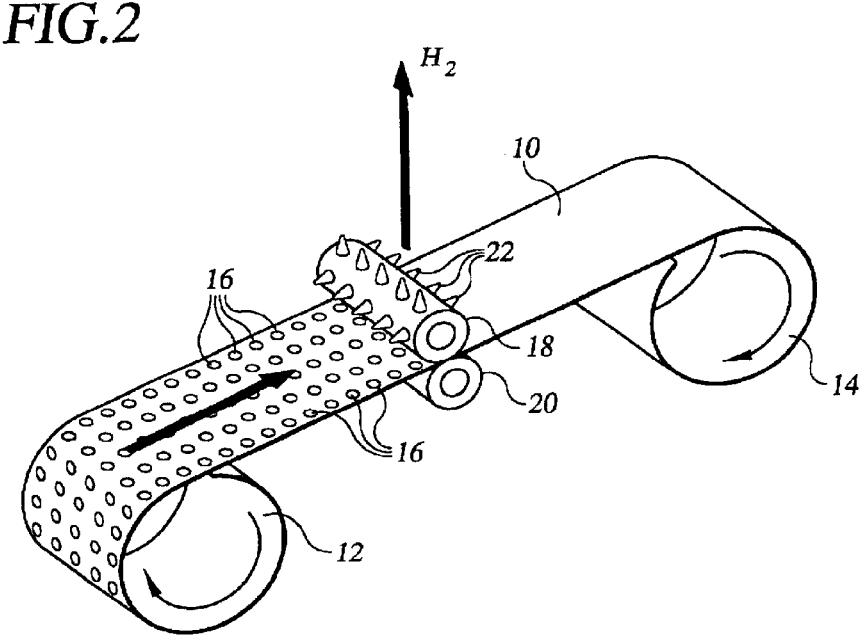
FIG. 2 is perspective view of one embodiment of the invention.

Another embodiment of the invention is shown in FIG. 2. A thin, flexible film is supported to move from a feed roll 12 onto a take-up roll 14. A suitable film 10 is porous polypropylene film or expanded polytetrafluoroethylene (PTFE). The flexible film 10 supports on its surface a plurality of cells 16 that contain therewithin a reactive solution such as $NaBH_4$ and water. The flexible film 10 and cells 16 form a structure analogous to bubble wrap. In addition to the feed roll 12 and take-up roll 14, there is provided a pair of rolls 18 and 20 through the nip of which passes the film 10 along with the cells 16. The roll 18 includes structure to penetrate the cells 16 as they pass through the nip between the rolls 18 and 20. As shown in FIG. 2, spikes 22 are provided on the surface of the roll 18 to rupture the cells 16. Other structures such as ridges may be used to penetrate the cells 16. Preferably, the spikes 22 are coated with a suitable catalyst such as ruthenium to catalyze the hydrolysis reaction.

In operation, the film structure 10 advances toward the take-up roll 14. As the film 10 passes through the nip formed by the rollers 18 and 20, the spikes 22 rupture the cells 16 allowing an aqueous solution of sodium borohydride to come into contact with the catalyst on the spikes 22. The catalyst, such as ruthenium, catalyzes an hydrolysis reaction so that hydrogen gas is released. The sodium metaborate, $NaBO_4$, by-product (shown in FIG. 1) is carried away from the reaction zone at the rolls 18 and 20 onto the take-up roll 14. In this way, the sodium metaborate by-product is disposed of. It will be appreciated by those skilled in the art that the rate of hydrogen evolution is controlled by the speed of the film 10 past the roll 18 and the relative density of the cells 16 on the film 10. The arrangement illustrated in FIG.

2 allows the cells 16 to contain a stoichiometric sodium borohydride solution since no pumping of a viscous solution is required and the waste by-product is removed from the reaction zone. It is contemplated that the film 10 will be configured to be a replaceable cartridge for ease of use.

Figure 3:
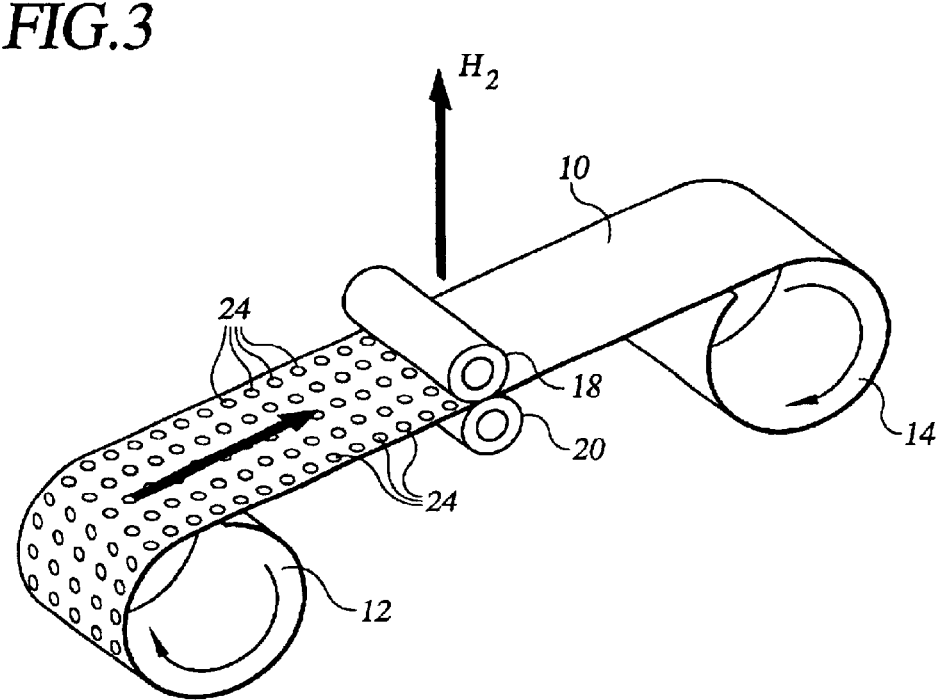
FIG. 3 is a perspective view of another embodiment of the invention.

Another embodiment of the invention is shown in FIG. 3. This embodiment is similar to that discussed above in conjunction with FIG. 2. In the embodiment of FIG. 3, glass or polymer microspheres 24 are disposed on the flexible membrane 10. Each of the microspheres 24 contains an aqueous sodium borohydride solution. The membrane 10 is doped with a metallic catalyst such as ruthenium. As the membrane 10 passes through the rolls 18 and 20 the microspheres 24 are crushed allowing the aqueous sodium borohydride solution to contact the catalyst (not shown) carried on the film 10. As with the embodiment of FIG. 2, hydrogen gas is released. Alternatively, the catalyst could be on the surface of the rolls 18 and/or 20 instead of being on the membrane 10.

It is preferred that the microspheres 24 be affixed to the substrate 10 having a consistent concentration (number of microspheres per area). With a consistent concentration of microspheres 24, the rate of hydrogen gas evolution can be controlled precisely by controlling the speed of the membrane 10. As with the embodiment of FIG. 2 the evolved hydrogen gas may be supplied to a fuel cell such as a PEM fuel cell (not shown). Unlike the embodiment of FIG. 2, the roll 18 may have a smooth surface for crushing the microspheres 24.

The system illustrated in FIG. 3 can respond to changes in hydrogen demand very quickly. Additionally, the sodium metaborate waste byproduct will be carried away from the reaction site. In fact, the reaction site will remain clean because the reactants and catalysts are continually being replenished.

Figure 4:
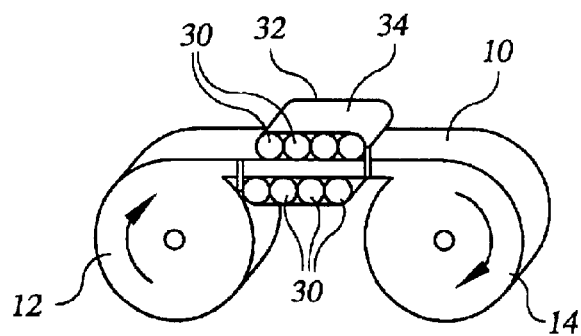
FIG. 4 is a perspective view of yet another embodiment of the invention.

Yet another embodiment of the invention is shown in FIG. 4. As with the earlier embodiments, a flexible carrier film 10 moves from a feed roll 12 to a take up roll 14. The film 10 carries on its surface a solid hydrogen source such as solid sodium borohydride. Suitable films 10 are flexible, porous, as thin as possible, and nonreactive to the catalysts, sodium borohydride, its by-product, hydrogen and water. It is also preferred that the film 10 not absorb water and be as low cost as possible. Porous polypropylene film, such as Celgard™ is suitable. Also suitable is expanded PTFE. It may be desirable to provide a binder or an overcoat to hold the sodium borohydride in place on the film 10. Suitable binder or overcoat materials should also be nonreactive to the compounds mentioned above and be flexible while allowing water to reach the sodium borohydride. Suitable overcoat materials are hydrocarbon polymers and more polar polymers such as polyvinyl alcohol and polyethyleneimine. A shrink-wrap kind of process might be used with the Celgard™ film to keep the sodium borohydride in place.

The carrier film 10 is brought into contact with catalyst-coated rods 30 as it moves from the feed roll 12 to takeup roll 14 as shown. A suitable catalyst is ruthenium. It is preferred that the rods 30 be hollow and perforated so that water can be pumped through the openings and reach the sodium borohydride on the film 10. The rods 30 may also be connected to an electrical circuit adapted to heat the rods 30 if desired. The rods 30 are preferably made of a nonreactive metal such as stainless steel onto which the catalyst coating is applied. The rods 30 are housed in a chamber 32 having hydrogen outlet 34 to connect, for example, to a fuel cell (not shown).

In operation, the solid sodium borohydride carried on the film 10 comes into contact with the catalyst coated rods 30 along with water preferably supplied through the rods 30. The resulting reaction, as with the previous embodiments, generates hydrogen and a sodium metaborate by-product. This reaction by-product will be carried out of the enclosure 32 and onto the take up roll 14.

Before use, the carrier film 10 on the feed roll 12 may be configured as a replaceable cartridge and may be stored in a flexible, impermeable bag. Similarly, after use the take up roll 14 may also be enclosed in a flexible, impermeable bag.

Figure 5:
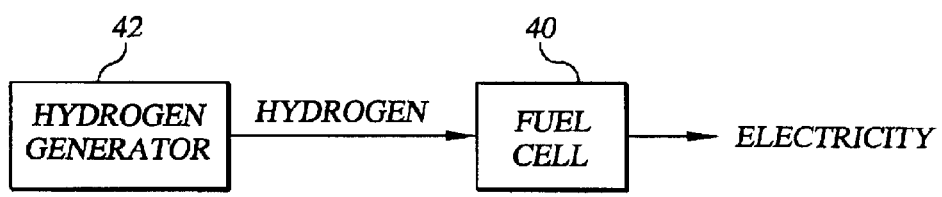
FIG. 5 is a block diagram of a fuel cell utilizing a hydrogen generator to generate electricity.
Figure 6:
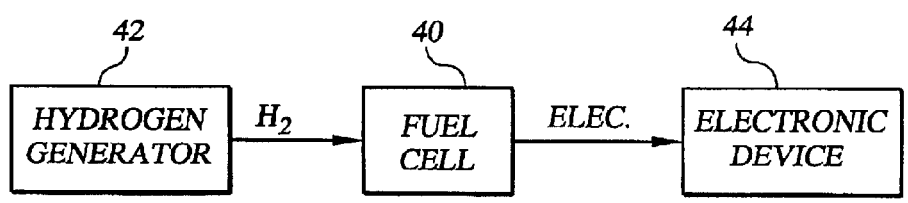
FIG. 6 is a block diagram of an electronic device receiving electricity from a fuel cell.

With reference now to FIG. 5, a fuel cell 40 such as a PEM fuel cell receives hydrogen from a hydrogen generator 42 to generate electricity. Suitable hydrogen generators 42 are those shown in FIGS. 2, 3, and 4. In another aspect, the invention illustrated in FIG. 6 is an electronic device 44 which is powered by electricity from fuel cell 40, which in turn receives hydrogen from a hydrogen generator 42. The electronic device 44 may be any electronic device such as cellphones, cam corders, computers, and personal digital assistants.

It is recognized that modifications and variations of this invention will become apparent to those skilled in the art and it is intended that all such modifications and variations be included within the scope of the attended claims.

What is claimed is:

1. Hydrogen generation system comprising:
   a source of sodium borohydride;
   a source of water;
   a catalyst;
   structure adapted to bring the sodium borohydride, water and catalyst into contact at a reaction zone to release hydrogen and to move by-product away from the reaction zone, wherein a solution of the sodium borohydride and water is encapsulated and supported on a flexible substrate.

2. The system of claim 1 wherein the solution is encapsulated in rupturable microspheres and the flexible substrate includes the catalyst thereon and further including rupturing structure to rupture the microspheres to allow the solution to contact the catalyst.

3. The system of claim 2 wherein the rupturing structure comprises rollers forming a nip there between.

4. The system of claim 1 wherein the solution is encapsulated in at least one penetratable compartment and further including catalyst-containing structure for penetrating the compartment to allow the catalyst to contact the solution.

5. The system of claim 4 wherein the catalyst containing structure has the form of spike-like elements extending from a roller.

6. The system of claim 3 wherein the flexible substrate moves from a supply roll to a take up roll.

7. The system of claim 1 wherein the catalyst is ruthenium.

8. The system of claim 2 wherein the microspheres are polymer or glass.

9. The system of claim 1 wherein the flexible substrate is polypropylene.

10. Hydrogen generation system comprising:
    a source of sodium borohydride;
    a source of water;
    a catalyst;
    structure adapted to bring the sodium borohydride, water and catalyst into contact at a reaction zone to release hydrogen and to move by-product away form the reaction zone wherein the sodium borohydride in solid form is supported on a flexible substrate for contact with at least one catalyst-coated element and further including structure for supplying water to contact the sodium borohydride and catalyst.

11. The system of claim 10 wherein the catalyst-coated element is hollow and perforated and wherein water is supplied to the interior of the element and passes through the element.

12. The system of claim 11 wherein the catalyst-coated element is heated.

13. The system of claim 12 further including an electrical circuit for heating the catalyst-coated element.

* * * * *